United States Patent

Yatsu et al.

[11] 4,144,388
[45] Mar. 13, 1979

[54] FILM-FORMING AND THERMOCURABLE VINYL ALCOHOL-SUBSTITUTED ACRYLAMIDE COPOLYMERS AND PROCESS FOR PRODUCTION THEREOF

[75] Inventors: Tadao Yatsu; Isaburo Higashi, both of Iwakuni, Japan

[73] Assignee: Mitsui Petrochemical Industries, Ltd., Tokyo, Japan

[21] Appl. No.: 859,470

[22] Filed: Dec. 12, 1977

[30] Foreign Application Priority Data

Dec. 14, 1976 [JP] Japan .................................. 51-149354
Sep. 13, 1977 [JP] Japan .................................. 52-109417

[51] Int. Cl.² .............................................. C08F 8/32
[52] U.S. Cl. .............................. 526/9; 260/29.6 TA; 260/32.6 N; 260/33.4 R; 260/33.6 UA; 428/442; 428/463; 428/473; 428/520; 526/8; 526/10; 526/16; 526/49; 526/303; 526/304; 526/305; 526/329.5
[58] Field of Search ...................... 526/8, 9, 10, 16, 49

[56] References Cited

U.S. PATENT DOCUMENTS 3,525,723  8/1970  Masuda et al. ........................... 526/8

FOREIGN PATENT DOCUMENTS 2641922   3/1977  Fed. Rep. of Germany.
45-9950  10/1970  Japan.
50-44282  4/1975  Japan.
52-63990  5/1977  Japan.
52-63991  5/1977  Japan.

OTHER PUBLICATIONS

"Kobunshi Kagaku," vol. 16, pp. 437–440 (1959).

*Primary Examiner*—Stanford M. Levin
*Attorney, Agent, or Firm*—Sherman & Shalloway

[57] ABSTRACT

A film-forming and thermocurable vinyl alcohol-substituted acrylamide copolymer consisting essentially of
(1) 0 to 20 mole% of a unit of the formula

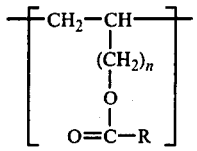

wherein R represents a group selected from the class consisting of alkyl groups with 1 to 7 carbon atoms and aryl groups with 6 to 7 carbon atoms, and n is 0 or 1,
(2) 30 to 70 mole% of a unit of the formula

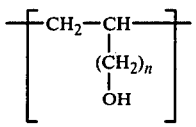

wherein n is as defined above,
(3) 0 to 20 mole% of a unit of the formula

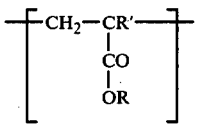

wherein R' represents a hydrogen atom or a lower alkyl group, and R is as defined above, and
(4) 30 to 70 mole% of a unit of the formula

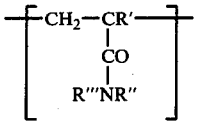

wherein R' is as defined above, R" represents a group selected from the class consisting of alkyl groups with 1 to 18 carbon atoms, cycloalkyl groups with 5 to 6 carbon atoms, hydroxyalkyl groups with 2 to 4 carbon atoms and aryl groups with 6 to 7 carbon atoms, and R''' represents a group selected from the class consisting of a hydrogen atom and the group R", the amount of each unit being based on the total amount in moles of units (1) to (4); and a process for production thereof. The above polymers are especially useful as a paint vehicle to provide coated films of various useful properties such as anti-haze property.

2 Claims, No Drawings

FILM-FORMING AND THERMOCURABLE VINYL ALCOHOL-SUBSTITUTED ACRYLAMIDE COPOLYMERS AND PROCESS FOR PRODUCTION THEREOF

This invention relates to novel film-forming and thermocurable vinyl alcohol-substituted acrylamide copolymers which can be used, for example, as vehicles for paints to provide coated films having superior properties, and to a process for producing these copolymers. The invention also relates to a coating composition containing said copolymer as a resin vehicle.

More specifically, the invention relates to a copolymer which has far better water resistance and alkali resistance than the most analogous known copolymer, can be formed into a coating composition utilizing an alcohol-type solvent thus obviating the need to use toxic solvents, and which permits the controlling of the hardness and flexibility of coated films prepared from such a coating composition.

In particular, the invention provides a film-forming and thermocurable vinyl alcohol-substituted acrylamide copolymer consisting essentially of (1) 0 to 20 mole% of a unit of the formula

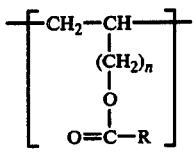

wherein R represents a group selected from the class consisting of alkyl groups with 1 to 7 carbon atoms and aryl groups with 6 to 7 carbon atoms, and $n$ is 0 to 1, (2) 30 to 70 mole% of a unit of the formula

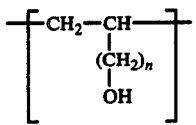

wherein $n$ is as defined above, (3) 0 to 20 mole% of a unit of the formula

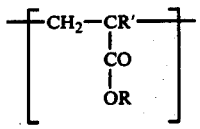

wherein R' represents a hydrogen atom or a lower alkyl group, and R is as defined above, and (4) 30 to 70 mole% of a unit of the formula

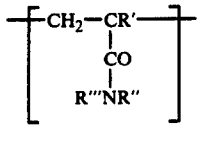

wherein R' is the same as defined above, R" represents a group selected from the class consisting of alkyl groups with 1 to 18 carbon atoms, cycloalkyl group with 5 to 6 carbon atoms, hydroxyalkyl groups with 2 to 4 carbon atoms and aryl group with 6 to 7 carbon atoms, and R''' represents a group selected from the group consisting of a hydrogen atom and the groups R", the amount of each unit being based on the total amount in mole of units (1) to (4).

"Kobunshi Kagaku", Vol. 16, pages 437–440, 1959 describes the copolymerization of acrylamide and vinyl acetate. This article describes a process similar to process (C) of the present invention to be described except that the alcohol reactant is not used and a copolymer of vinyl acetate and acrylamide is hydrolyzed in the presence of a basic compound such as potassium hydroxide. It is reported that the resulting product is a four-component copolymer containing acrylamide, acrylic acid, vinyl acetate and vinyl alcohol. Copolymers containing a substantial amount of an acrylic acid unit have poor water resistance. Furthermore, the article gives no statement about the properties of the resulting copolymer.

Japanese Patent Publication No. 26827/67 (published on Dec. 19, 1967) discloses a saponification product of a copolymer with an acrylamide content of 0.4 to 17 mole% which is obtained by saponifying 75 to 95 mole% of acetic acid groups contained in a copolymer of vinyl acetate and acrylamide, and is useful as a textile finishing agent, especially a textile size used in weaving. This copolymer is distinguished from the copolymer of this invention in that it corresponds to a copolymer of the invention in which R" and R''' in unit (4) are both hydrogen atoms. The copolymer of this patent has much lower water resistance and alkali resistance than the copolymer of this invention, as can be seen also from its utility.

For many years, the present inventors worked on the development of film-forming and thermocurable vinyl alcohol-substituted acrylamide copolymers having unique and excellent properties. The work lead to the successful development of a modified copolymer consisting of the units described hereinabove which has not been described in the literature, and to the discovery that this novel copolymer finds a wide range of applications in the field of coating techniques.

The novel modified copolymer can be used, for example, as an anti-haze agent, a paint vehicle, a surface treating agent for leather, a base agent for extraction of oil in water, a primer for adhesion of metal to plastics, and an anionic flocculant. When it is used as an anti-haze agent, or as a surface coating agent for metal or glass, an aqueous or organic solvent solution of the modified copolymer is coated on the surface of glass, a mirror or metal, and dried to provide a coating having an anti-haze effect. By heat-treating the resulting coating, the copolymer partially undergoes cross-linking, lactamization or lactonization, and the coating attains superior water resistance.

The hardness and flexibility of the coating can be changed as desired by suitably selecting the types and amounts of the constituent units of the copolymer. Hence, the modified copolymer is useful in a wide range of applications.

It is an object of this invention to provide a new type of film-forming and thermocurable vinyl alcohol-substituted acrylamide copolymer.

Another object of the invention is to provide a process for producing said copolymer.

The above and other objects of the invention along with its advantages will become more apparent from the following description.

The copolymer of the invention consists essentially of the following units (1) to (4):

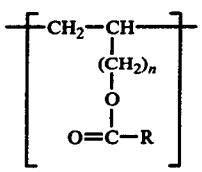 unit (1)

wherein R and n are as defined above,

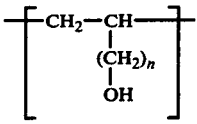 unit (2)

wherein n is as defined above,

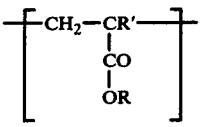 unit (3)

wherein R and R' are defined above, and

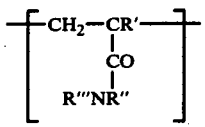 unit (4)

wherein R', R" and R'" are as defined above.

The amounts based on the total amount in mole of units (1) to (4) are:

0 to 20 mole%, preferably 0 to 10 mole%, of unit (1),
(30 to 70 mole%, preferably 35 to 65 mole%, of unit (2),
0 to 20 mole%, preferably 0 to 10 mole%, of unit (3) and
30 to 70 mole%, preferably 35 to 65 mole%, of unit (4).

Preferred copolymers are those in which units (2) and (4) form combinations of the formula

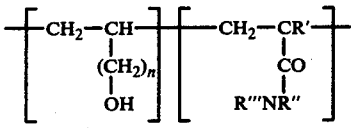

and

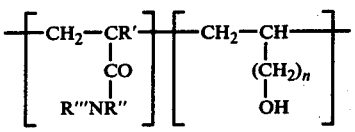

wherein R', R", R'", and n are as defined hereinabove, and the content of the combination unit is at least about 30 mole%, preferably about 40 to about 100 mole%, based on the total amount in moles of units (1) to (4). The amount of the combined unit can be determined from the $C^{13}$ NMR spectra of the copolymer of this invention and the copolymer used as a starting material for it.

The copolymer of the invention has a number average molecular weight (in dimethyl formamide), $\overline{M}_n$, of preferably about 500 to about 100,000, more preferably about 1000 to about 50,000, as measured by a vapor pressure molecular weight measuring device.

The copolymer of this invention can be produced by various processes. In particular, the following processes (A) to (C) can be exemplified.

[I] Process (A)

A copolymer consisting essentially of a unit of the formula

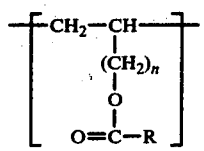 (1)

wherein R represents a group selected from the class consisting of alkyl groups with 1 to 7 carbon atoms and acryl groups with 6 or 7 carbon atoms, and n is 0 or 1, and a unit of the formula

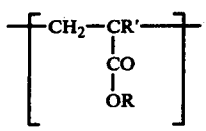 (3)

wherein R' represents a hydrogen atom or a lower alkyl group, and R is as defined, is reacted with an amine selected from primary and secondary amines of the formula

$NH_2R''$ and

$NHR''R'''$ wherein R" represents a group selected from the class consisting of alkyl groups with 1 to 18 carbon atoms, preferably 1 to 12 carbon atoms, cycloalkyl groups with 5 to 6 carbon atoms, hydroxyalkyl groups with 2 to 4 carbon atoms and aryl groups with 6 to 7 carbon atoms, and R'" is a group selected from the class consisting of a hydrogen atom and the groups R".

As a result of the above reaction, the unit (1) is converted partly or wholly into a unit of the following formula

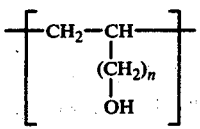 (2)

wherein n is as defined hereinabove
and the unit (3) is converted partly or wholly into a unit of the formula

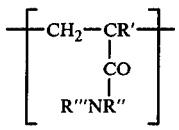 (4)

wherein R', R" and R'" are as defined hereinabove.

The copolymer consisting essentially of units (1) and (3), used as a starting material in process (A), can be obtained by known methods disclosed, for example, in Japanese Patent Publication No. 9950/70 (published on Apr. 10, 1970), German OLS No. 2641922 (laid open on Mar. 24, 1977), and Japanese Laid-Open Patent Publications Nos. 44282/75 (laid open on Apr. 21, 1975) and 36181/77 (laid open on Mar. 19, 1977).

According to the methods disclosed in the two Japanese Laid-Open Patent Publications cited above, the starting copolymer consisting essentially of units (1) and (3) can be prepared by copolymerizing an unsaturated carboxylic acid ester (1') for forming unit (1)

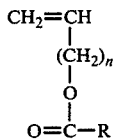 (1')

wherein R and n are as defined with regard to unit (1),
with an acrylic-type carboxylic acid ester (3') for forming unit (3)

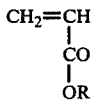 (3')

wherein R is as defined with regard to unit (3),
in the presence of a catalyst composed mainly of an organo-aluminum compound of the formula

wherein Y represents an alkyl group, X represents a halogen atom, and $0 < m < 3$.

The starting copolymer may also be a highly random copolymer obtained by an ordinary free radical copolymerization method which comprises copolymerizing 1 mole of the aforesaid unsaturated ester of a carboxylic acid and 0.05 to 2 moles of the aforesaid acrylic-type carboxylic acid ester in the presence of a radical polymerization catalyst while feeding them continuously.

Of these starting copolymers, those produced by the methods suggested in the above-cited Japanese Laid-Open Patent Publications Nos. 44282/75 and 36181/77 are especially preferred for process (A) because the unsaturated carboxylic acid ester unit (1) and the acrylic-type carboxylic acid unit (3) are aligned highly alternately, and these copolymers are of straight chain, thus serving to form modified copolymers containing the combined units described hereinabove.

Examples of preferred unsaturated esters of formula (1') are unsaturated esters of carboxylic acids with 3 to 10 carbon atoms. Specific examples include vinyl formate, vinyl acetate, vinyl propionate, vinyl butyrate, vinyl caproate, vinyl valerate, vinyl benzoate, allyl acetate, allyl propionate, allyl benzoate, isopropenyl formate, isopropenyl acetate, isopropenyl propionate, methallyl acetate, methallyl propionate, 1-butenyl acetate, and 1-butenyl propionate. They may be used either singly or as mixtures.

It is preferred to use in the process of this invention a copolymer containing a unit of an organic carboxylic acid ester of an unsaturated alcohol with 2 to 4 carbon atoms as the unsaturated carboxylic acid ester unit. More preferably, the alcohol moiety of the unsaturated carboxylic acid ester unit is vinyl alcohol or allyl alcohol.

Preferred acrylic-type carboxylic acid esters of formula (3') are those containing 4 to 10 carbon atoms, especially 4 to 8 carbon atons. Specific examples include acrylic acid esters such as methyl acrylate, ethyl acrylate, propyl acrylate, butyl acrylate, phenyl acrylate and benzyl acrylate; methacrylic acid esters such as methyl methacrylate, ethyl methacrylate, propyl methacrylate, butyl methacrylate, phenyl methacrylate, benzyl methacrylate, and tolyl methacrylate; α-substituted acrylic acid esters such as methyl α-phenylacrylate, ethyl α-phenylacrylate and ethyl α-ethylacrylate; β-substituted acrylic acid esters such as methyl crotonate and ethyl crotonate. Of these, the acrylic acid esters and methacrylic acid esters are preferred. These compounds can be used either singly or as admixtures.

In the copolymerization of the unsaturated carboxylic acid ester of formula (1') with the acrylic-type carboxylic acid ester of formula (3'), a small amount of a third monomer copolymerizable with the ester (1') and/or the ester (3') may be added. Examples of the third monomer are α-olefins such as ethylene, propylene, 1-butene or 4-methyl-1-pentene, dienes such as butadiene or isoprene, aromatic olefins such as styrene or α-methylstyrene, and polar vinyl compounds such as vinyl chloride, acrylamide, acrylonitrile or methacrylonitrile. The purpose of adding the third monomer is to improve various properties required of the modified copolymer, such as higher flexibility, water resistance and rigidity according to its use. The amount of the third monomer should be small to such an extent that in the copolymer obtained by copolymerizing the unsaturated carboxylic acid ester of formula (1') with the acrylic-type carboxylic acid ester of formula (3'), the proportion of unit (1) should be limited to 30 to 70 mole%, preferably 35 to 65 mole%, and the proportion of unit (3), to 30 to 70 mole%, preferably 35 to 65 mole%. If the amount of the third component is larger than the specified limit, the proportions of units (2) and (4) in the resulting modified copolymer fall outside the ranges described and claimed in the present application, and such a modified copolymer can no longer form coatings of superior quality.

According to the process (A), the starting copolymer consisting essentially of 30 to 70 mole%, preferably 35 to 65 mole%, of unit (1) and 30 to 70 mole%, preferably 35 to 65 mole%, of unit (3), the amounts being based on the total amount of units (1) and (3) is reacted with the amine of the formula $NH_2R''$ or $NHR''R'''$.

Examples of the primary amine are alkylamines with 1 to 18 carbon atoms such as methylamine, ethylamine, propylamine, isopropylamine, butylamine, pentylamine, hexylamine, octylamine, dodecylamine, tetradecylamine, pentadecylamine and octadecylamine; cycloalkylamine containing 5 and 6 carbon atoms such as cyclohexylamine; acrylamines with 6 and 7 carbon atoms such as aniline, toluidine or benzylamine; and alkanolamines with 2 to 4 carbon atoms such as ethanolamine or propanolamine. Examples of the secondary amine are dialkylamines with 1 to 18 carbon atoms such as dimethylamine, diethylamine, dipropylamine, diisopropylamine, dibutylamine, dipentylamine, dihexylamine or dioctylamine; arylamines or heterocyclic amines such as diphenylamine, ditolylamine, dibenzylamine, piperidine or piperazine; and dialkanolamines with 4 to 8 carbon atoms such as diethanolamine or dipropanolamine.

In process (A), the reaction between the starting copolymer and the amine can be performed in the presence or absence of a reaction solvent. Usually, the reaction is carried out using an amine in an amount sufficient to act as a solvent. If desired, a solvent may be separately used. Such reaction solvents include aromatic hydrocarbons such as benzene, toluene or xylene; alcohols such as methanol, ethanol or propanol; and ethers such as diethyl ether, ethylene glycol dimethyl ether or tetrahydrofuran.

The reaction can be performed easily with stirring while maintaining the temperature at usually 0° to about 300° C., preferably about 20° to about 250° C. under sufficient pressures to maintain the reaction system in the liquid phase. Usually, the pressure is atmospheric pressure to about 20 kg/cm$^2$.

When no other solvent is used, and the amine as a reactant is used in an amount sufficient to serve also as a solvent, the starting copolymer is usually insoluble or only slightly soluble in the reaction system, but with the progress of the amidation reaction, the resulting modified polymer dissolves in the reaction system. The final modified polymer can be recovered in a customary manner by evaporating off the excess of the amine, the by-product alcohol and amide and optionally the solvent from the reaction mixture, and separating the precipitated modified copolymer, washing it and drying it; or by placing the reaction mixture in a solvent incapable of dissolving the final modified copolymer to precipitate the copolymer, and separating, washing and drying the separated copolymer.

Thus, as a result of process (A), unit (1) is converted partly or wholly to unit (2), and unit (3) is converted partly or wholly to unit (4). Hence, a modified copolymer consisting substantially of units (2) and (4) can be formed. By properly controlling the reaction temperature, the reaction time, the concentration of the amine, and the concentration of the starting copolymer, and thus converting the constituent units of the starting copolymer partly into the unsaturated alcohol unit (2) and the acrylamide unit (4), there can be obtained a three-component modified copolymer composed of the unsaturated alcohol unit (2), the acrylamide unit (4) and the acrylic acid-type carboxylic acid ester unit (3), another three-component modified copolymer composed of the unsaturated alcohol unit (2), the acrylamide unit (4) and the unsaturated carboxylic acid ester unit (1) and a four-component modified copolymer composed of the unsaturated alcohol unit (2), the acrylamide unit (4), the unsaturated carboxylic acid ester unit (1) and the acrylic-type carboxylic acid ester unit (3).

[II] Process (B)

A copolymer consisting essentially of a unit of the formula

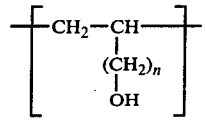

wherein $n$ is 0 or 1,
and a unit of the formula

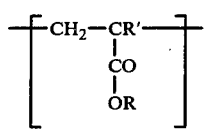

wherein R' represents a hydrogen atom or a lower alkyl group, and R represents a group selected from the class consisting of alkyl groups with 1 to 7 carbon atoms and aryl groups with 6 to 7 carbon atoms, is reacted with an amine selected from primary and secondary amines of the formulae

NH$_2$R'' and

NHR''R''' wherein R'' represents a group selected from the class consisting of alkyl groups with 1 to 18 carbon atoms, preferably 1 to 12 carbon atoms, cycloalkyl groups with 5 to 6 carbon atoms, cycloalkyl groups with 2 to 4 carbon atoms and aryl groups with 6 to 7 carbon atoms and R''' represents a group selected from the class consisting of a hydrogen atom and the groups R''.

As a result of this reaction, the unit (3) is converted partly or wholly into unit (4) of the formula

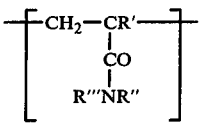

wherein R', R'' and R''' are as defined hereinabove.

The starting copolymer consisting essentially of units (2) and (3) can be prepared by known methods disclosed, for example, in Japanese Laid-Open Patent Publications Nos. 44282/75 (laid open on Apr. 21, 1975), 36181/77 (laid open on Mar. 19, 1977), 63990/77 (laid open on May 26, 1977), and 63991/77 (laid open on May 26, 1977).

One typical method comprises reacting the starting copolymer formed from the unsaturated carboxylic acid ester of formula (1') and the acrylic-type carboxylic acid ester of formula (3') with an alcohol in the presence of a basic compound (see the above-cited Japanese Laid-Open Publications Nos. 63990/77 and 63991/77). This method will be more specifically described below.

The alcohol includes, for example, methanol, ethanol, propanol, butanol, amyl alcohol, and cyclohexanol, but methanol is commonly employed. Generally, the alcohol is used in a large excess to cause it to serve also as a reaction solvent. In addition to the alcohol, another solvent may be used. Examples of the other solvent are hydrocarbons such as pentane, hexane, benzene, toluene or xylene; ketones such as acetone, methyl ethyl ketone, methyl isobutyl ketone or diethyl ketone; and halogenated hydrocarbons such as methylene chloride and chloroform.

The reaction between the copolymer and the alcohol is carried out in the presence of a basic compound. Examples of the basic compound are alkali metal hydroxides such as lithium hydroxide, sodium hydroxide and potassium hydroxide; alkali metal oxides such as lithium oxide, sodium oxide and potassium oxide; alkaline earth metal hydroxides such as calcium hydroxide and barium hydroxide; alkali metal alkoxides such as lithium methoxide, lithium ethoxide, lithium propoxide, lithium butoxide, sodium methoxide, sodium ethoxide, sodium propoxide, sodium butoxide; potassium methoxide, potassium ethoxide, potassium propoxide and potassium butoxide; organic alkali metal compounds such as butyl lithium and phenyl lithium; organic basic compounds such as ethylamine, diethylamine, triethylamine, propylamine, dipropylamine, pyridine and quinoline; and ammonia. Of these, the alkali metal hydroxides or alkoxides are preferred.

The basic compound is used after directly dissolving it in an alcohol, or dissolving a small amount of it in water and then mixing the aqueous solution with an alcohol. In the latter case, the amount of water should be minimized because excessive water results in the comsumption of the basic compound by saponification.

The amount of the basic compound is 0.01 to 10% by weight, preferably 0.05 to 5% by weight, based on the copolymer.

The aforesaid reaction is carried out by stirring a mixture consisting of the copolymer composed of units (1) and (3), the basic compound, the alcohol and optionally a solvent at a temperature of 20° to 200° C., preferably 30° to 100° C., under sufficient pressures to maintain the reaction system in the liquid phase. It is preferred that at this time, the starting copolymer containing units (1) and (3) be dissolved in the reaction system. When an alcohol such as methanol, ethanol or propanol is used in an amount sufficient to cause it serve also as a solvent, the starting copolymer dissolves in the reaction system, but as the alcoholysis reaction proceeds, the product precipitates as an insoluble resin powder. The desired modified copolymer can be obtained by separating the precipitate by filtration and washing and drying it in a customary manner. When a solvent capable of dissolving the modified copolymer is used as a reaction solvent, the crude product is separated by evaporating off the solvent, and then washed with another solvent, followed by drying it to afford the desired copolymer containing units (2) and (3).

Preferred starting copolymers are those obtained by the aforesaid methods which are of straight chain and in which units (2) and (3) are aligned highly alternately, because they serve to form the combined units (2) and (4) or (4) and (2) described hereinabove.

Examples of the unsaturated carboxylic acid ester of formula (1') and the acrylic-type carboxylic acid ester of formula (2') used in producing the starting copolymer for process (B) are those already exemplified hereinabove with regard to process (A).

According to the process (B), the starting copolymer consisting essentially of 30 to 70 mole%, preferably 35 to 65 mole%, of unit (2) and 30 to 70 mole%, preferably 35 to 65 mole%, of unit (3), the amounts being based on the total amount of the units (2) and (3) is reacted with the amine of formula $NH_2R''$ or $NHR''R'''$. Examples of the amine are the same as those already given hereinabove with regard to process (A).

In process (B) also, the reaction of the starting copolymer with the amine can be carried out in the presence or absence of a reaction solvent. Usually, the reaction is carried out using the amine in an amount sufficient to cause it to serve also as a solvent. If desired, a reaction solvent may be separately used. Examples of such other solvent are those given hereinabove with regard to process (A).

The reaction can be easily performed with stirring at a temperature of usually about −70° C. to about 300° C., preferably about −30° C. to about 200° C. under sufficient pressures to maintain the reaction system in the liquid phase. The pressure is about atmospheric pressure to about 10 kg/cm$^2$. The reaction product can be separated and collected from the reaction mixture in the same way as described hereinabove with regard to process (A).

Thus, by process (B), unit (3) is converted partly or wholly to unit (4). When unit (3) is partly converted to unit (4), a modified copolymer composed of the unsaturated alcohol unit (2), the acrylic-type carboxylic acid ester unit (3) and the acrylamide unit (4) can be formed. When the entire unit (3) is converted to unit (4), a modified copolymer composed of units (2) and (4) can be formed.

Thus, process (B) affords a modified copolymer consisting essentially of 30 to 70 mole%, preferably 35 to 65 mole%, of unit (2), 0 to 20 mole%, preferably 0 to 10 mole%, of unit (3), and 30 to 70 mole%, preferably 35 to 65 mole%, of unit (4).

[III] Process (C)

A copolymer consisting essentially of a unit of the formula

(1)

wherein R represents a group selected from the class consisting of alkyl groups with 1 to 7 carbon atoms and aryl groups with 6 to 7 carbon atoms, and n is 0 or 1,
and a unit of the formula

(4)

wherein R' represents a hydrogen atom or a lower alkyl group, R'' represents a group selected from the class consisting of alkyl groups with 1 to 18 carbon atoms, cycloalkyl groups with 5 to 6 carbon atoms, hydroxyalkyl groups with 2 to 4 carbon atoms and aryl groups with 6 to 7 carbon atoms, and R''' represents a group selected from the class consisting of a hydrogen atom and the groups R'', is reacted with an alcohol in the presence of a basic compound.

As a result of this reaction, unit (1) is converted partly or wholly into unit (2) of the formula

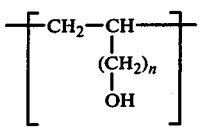

wherein n is as defined hereinabove.

The starting copolymer consisting essentially of units (1) and (4) for use in process (C) can be produced, for example in accordance with the method disclosed in Japanese Laid-Open Patent Publication No. 63991/77, by the free radical copolymerization of an unsaturated ester of a carboxylic acid of formula (1') for forming unit (1)

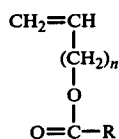 (1')

wherein R and n are the same as defined hereinabove with regard to unit (1),
with an N-substituted acrylamide of formula (4') to form unit (4)

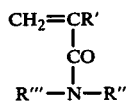 (4')

wherein R', R" and R'" are as defined above with regard to unit (4).

Example of the unsaturated carboxylic acid ester (1') are the same as those already given hereinabove with regard to process (A). Examples of the N-substituted acrylamide of formula (4') include N-methyl acrylamide, N-ethyl acrylamide, N-propyl acrylamide, N-isopropyl acrylamide, N-butyl acrylamide, N-n-hexyl acrylamide, N-n-octyl acrylamide, N-n-decyl acrylamide, N-n-dodecyl acrylamide, N-n-pentadecyl acrylamide, N-n-octadecyl acrylamide, N-cyclohexyl acrylamide, N-phenyl acrylamide, N-p-tolyl acrylamide, N-benzyl acrylamide, N,N-dimethyl acrylamide, N,N-dipropyl acrylamide, N,N-diisopropyl acrylamide, N,N-dibutyl acrylamide, N,N-di-n-hexyl acrylamide, N,N-dicyclohexyl acrylamide, N,N-diphenyl acrylamide, N,N-dibenzyl acrylamide, N-methyl methacrylamide, N-ethyl methacrylamide, N-n-propyl methacrylamide, N-n-butyl methacrylamide, N-n-hexyl methacrylamide, N-n-dodecyl methacrylamide, N-n-pentadecyl methacrylamide, N-n-octadecyl methacrylamide, N-cyclohexyl methacrylamide, N-phenyl methacrylamide, N-benzyl methacrylamide, N,N-dimethyl methacrylamide, N,N-di-n-propyl methacrylamide, N,N-di-n-butyl methacrylamide, N,N-dicyclohexyl methacrylamide, N,N-diphenyl methacrylamide, N-methyl-α-ethyl acrylamide, N-ethyl-α-ethyl acrylamide, N-n-propyl-α-ethyl acrylamide, N-n-butyl-α-ethyl acrylamide, N,N-dimethyl-α-ethyl acrylamide, N,N-diethyl-α-ethyl acrylamide, N,N-dipropyl-α-ethyl acrylamide, N,N-dibutyl-α-ethyl acrylamide, N-methyl-β-methyl acrylamide, N-ethyl-β-methyl acrylamide, N-n-propyl-β-methyl acrylamide, N-n-butyl-β-methyl acrylamide, N,N-dimethyl-β-methyl acrylamide, N,N-diethyl-β-methyl acrylamide, N,N-di-n-propyl-β-methyl acrylamide, and N,N-di-n-butyl-β-methyl acrylamide.

The acrylamide component in the copolymer may be one, or a mixture of at least two, of these acrylamide compounds. The use of acrylamides or methacrylamides with 3 to 21 carbon atoms is preferred.

In the free radical copolymerization of the unsaturated carboxylic acid ester of formula (1') with the N-substituted acrylamide of formula (4'), a small amount of a third monomer copolymerizable with components (1') and/or (4') may be used. Examples of the third monomer are free radical polymerizable olefins such as ethylene or styrene and polar vinyl compounds such as vinyl chloride, vinylidene chloride, acrylonitrile and methacrylonitrile. The purpose of adding the third monomer is to impart higher flexibility, water resistance and rigidity, etc. to the modified copolymer composed mainly of units (2) and (4) obtained by process (C). The amount of the third monomer should be small to such an extent that in the resulting copolymer, the proportion of each of the units (1) and (4) is 30 to 70 mole%, preferably 35 to 65 mole%. If the amount is larger than the specified range, the proportions of the components (1') and (4') fall outside the range described and claimed in the present application, and the resulting modified copolymer can no longer give films having superior properties.

According to process (C), the starting copolymer consisting essentially of 30 to 70 mole%, preferably 35 to 65 mole%, of unit (1) and 30 to 70 mole%, preferably 35 to 65 mole%, of unit (4) is reacted with an alcohol in the presence of a basic compound.

Examples of usable alcohols are methanol, ethanol, propanol, butanol, amyl alcohol, and cyclohexanol. Usually, methanol is used. Generally, the alcohol is used in a large excess in order to cause it to act also as a reaction solvent. Other solvents may be used together with the alcohol. Examples of the other solvent are hydrocarbons such as pentane, hexane, benzene, toluene and xylene; ketones such as acetone, methyl ethyl ketone, methyl isobutyl ketone and diethyl ketone; and halogenated hydrocarbons such as methylene chloride and chloroform.

The reaction between the copolymer and the alcohol is carried out in the presence of a basic compound. Examples of the basic compound that can be used are alkali metal hydroxides such as lithium hydroxide, sodium hydroxide and potassium hydroxide; alkali metal oxides such as lithium oxide, sodium oxide and potassium oxide; alkaline earth metal hydroxides such as calcium hydroxide and barium hydroxide; alkali metal alkoxides such as lithium methoxide, lithium ethoxide, lithium propoxide, lithium butoxide, sodium methoxide, sodium ethoxide, sodium propoxide, sodium butoxide, potassium methoxide, potassium ethoxide, potassium propoxide and potassium butoxide; organic alkali metal compounds such as butyl lithium and phenyl lithium; organic basic compounds such as ethylamine, diethylamine, triethylamine, propylamine, dipropylamine, pyridine and quinoline; and ammonia. Of these, the alkali metal hydroxides and alkoxides are preferred.

The basic compound is used after directly dissolving it in an alcohol; or dissolving it in a small amount of water and mixing the aqueous solution with alcohol. In the latter case, the amount of water should be minimized since excessive water results in the consumption of the basic compound by saponification. The amount of the basic compound used is 0.01 to 10% by weight, preferably 0.05 to 5% by weight, based on the copolymer.

The reaction is performed by stirring a mixture composed of the copolymer consisting of units (1) and (4), the basic compound, the alcohol and optionally another solvent at a temperature of 20° to 200° C., preferably 30° to 100° C., under sufficient pressures to maintain the reaction system in the liquid phase. At this time, it is preferred that the copolymer containing units (1) and (4) be dissolved in the reaction system. This reaction proceeds while the product remains dissolved in the alcohol solution. The desired product can therefore be recovered, for example, by (1) a re-precipitation method which comprises pouring the reaction mixture in a large excess of a poor solvent for it (e.g., ketones such as acetone or methyl ethyl ketone; esters such as methyl acetate and ethyl acetate; and hydrocarbons such as toluene, benzene and hexane); (2) a method which comprises pouring the poor solvent into the reaction mixture after the reaction, to precipitate the product; (3) a method which comprises precipitating the product as an insoluble resin powder with the progress of the reaction by using a mixture of the poor solvent and alcohol; or (4) a method which comprises removing the solvent by distillation, etc. after the reaction.

When the resulting modified copolymer is intended for use as a paint or antihaze agent, the reaction solution can be directly used.

Thus, process (C) can afford a modified copolymer consisting of the unsaturated carboxylic acid ester unit (1), the unsaturated alcohol unit (2) and the N-substituted acrylamide unit (4) when unit (1) is partly converted to unit (2); or a modified copolymer consisting of units (2) and (4) when unit (1) is wholly converted to unit (2). In this way, according to process (C), a modified copolymer can be produced which consists of 0 to 20 mole%, preferably 0 to 10 mole%, of unit (1), 30 to 70 mole%, preferably 35 to 65 mole%, of unit (2), and 30 to 70 mole%, preferably 35 to 65 mole%, of unit (4).

According to this invention, processes such as the processes (A) to (C) described in detail hereinabove can afford a noval film-forming and thermocurable vinyl alcohol-substituted acrylamide copolymer consisting essentially of (1) 0 to 20 mole%, preferably 0 to 10 mole%, of a unit of the formula

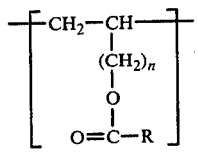

wherein R represents a group selected from the class consisting of alkyl groups with 1 to 7 carbon atoms and aryl groups with 6 to 7 carbon atoms, and $n$ is 0 or 1.

(2) 30 to 70 mole%, preferably 35 to 65 mole%, of a unit of the formula

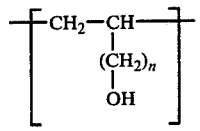

wherein $n$ is as defined above, (3) 0 to 20 mole%, preferably 0 to 10 mole%, of a unit of the formula

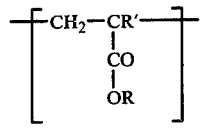

wherein R' represents a hydrogen atom or a lower alkyl group, and R is as defined above, and (4) 30 to 70 mole%, preferably 35 to 65 mole%, of a unit of the formula

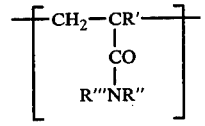

wherein R' is as defined above, R" represents a group selected from the class consisting of alkyl groups with 1 to 18 carbon atoms, cycloalkyl groups with 5 to 6 carbon atoms, hydroxyalkyl groups with 2 to 4 carbon atoms and aryl groups with 6 to 7 carbon atoms, and R'" represents a group selected from the class consisting of a hydrogen atom and the groups R", the amounts of each unit being based on the total amount of units (1) to (4).

The properties of the modified copolymer can be varied over a wide range according to the types of units (1) to (4), their combinations and proportions, etc. For example, the copolymer is water-soluble when the number of carbon atoms of the unsaturated alcohol unit (2) is small as in vinyl alcohol, and the amide group of the acrylamide component (4) contains a hydrophilic functional group as in N-2-hydroxyethyl acrylamide. On the other hand, when the number of carbon atoms of the unsaturated alcohol component (2) is large and the amide group of the acrylamide component (4) is substituted with a hydrocarbon group having a large number of carbon atoms, the copolymer of this invention is insoluble in water but has hydrophilicity showing wettability with water as its surface.

Because of these properties, the copolymers of this invention can be used in various applications, for example, as an anti-haze agent, a paint vehicle, a leather surface treating agent, a basic ingredient of a composition for extracting oil in water, a primer for adhesion of metal to plastics, and an anionic flocculating agent.

Coated films having superior resistance to water and alkalies can be prepared from the copolymer of this invention. If the copolymer is water-soluble, it is dissolved in water or a mixture of it with a polar solvent such as alcohols (e.g., methanol, ethanol, or isopropanol), coated on a substrate and then cured by heating at a temperature of about 120° to about 400° C. for 0.1 to 30 minutes. This results in a molecular structure containing a cyclized structure expressed, for example, by the following formulae

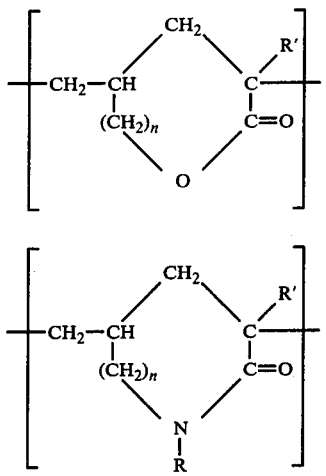

thus attaining superior resistance to water and alkalies.

If the copolymer is water-insoluble, it is dissolved in an alcoholic solvent, such as methanol, ethanol, isopropanol, n-propanol, isobutanol, t-butanol, mixtures of these, or a mixture of such an alcohol with water, and by the same procedure as above, a coated film having superior resistance to water and alkalies can be formed.

When the copolymer of this invention is used as an anti-haze agent, an aqueous or organic solvent solution of the copolymer is coated on the surface of glass, a mirror or metal, and dried to provide a coating having an anti-haze effect. By heat-treating the resulting coating, the copolymer partially undergoes cross-linking, lactamization or lactonization, and thus attains superior water resistance. For use as anti-haze agents, straight-chain copolymers consisting essentially of 70 to 30 mole% of the unsaturated alcohol unit (2), 30 to 70 mole% of the N-substituted-acrylamide unit (4) and 0 to 20 mole% of the acrylic-type carboxylic acid ester unit (3) with 4 to 8 carbon atoms and having a number average molecular weight ($\overline{Mn}$) of 500 to 100,000, especially 1,000 to 50,000, are preferred. Especially preferred copolymers are straight-chain copolymers consisting of 65 to 35 mole% of the unsaturated alcohol unit (2), 35 to 65 mole% of the acrylamide unit (4) and 0 to 10 mole% of the acrylic-type carboxylic acid ester unit (3) and having a number average molecular weight of 500 to 100,000, especially 1,000 to 50,000. It is more preferred to use straight-chain copolymers contaning vinyl alcohol or allyl alcohol as the unsaturated alcohol unit (2), an N-substituted-acrylamide or methacrylamide as the acrylamide unit (4) and an acrylic or methacrylic acid ester as the carboxylic acid ester unit (3) and having a number average molecular weight of 500 to 100,000, especially 1,000 to 50,000.

The following examples illustrate the present invention in more detail.

EXAMPLE 1

A 10-liter separable flask equipped with a stirring device, a condenser, a thermometer and two metering pumps was used as a polymerization reactor. It was purged with nitrogen prior to polymerization.

Methyl benzoate (111.9 ml; 900 mmoles) was mixed with 6570 ml of n-hexane, and the mixture was cooled to below 5° C. by using a ice water bath. With stirring, 46.3 ml (450 mmoles) of ethyl aluminum dichloride was added to the solution slowly. The mixture was maintained for an additional 30 minutes at this temperature to form a complex of methyl benzoate and ethyl aluminum dichloride. With stirring at this temperature, a mixture of 1331 ml (15.5 moles) of vinyl acetate and 1067 ml (12.4 moles) of methyl acrylate and a mixture of 41.9 ml (225 mmoles) of t-butyl peroxy isopropyl carbonate and 1600 ml of n-hexane were continuously fed at a given rate for 5 hours by the two metering pumps, thereby to perform copolymerization. The resulting copolymer precipitated as a slurry in the reaction system, and its amount increased with the passage of the polymerization time. After the feeding of the mixtures, the contents of the flask were maintained for an additional 2 hours with stirring, and an n-hexane solution containing a small amount of isopropanol was added. The copolymer was recovered by performing filtration and washing with n-hexane twice, and then dried overnight in vacuo at room temperature. The amount of the vinyl acetate/methyl acrylate copolymer obtained was 2150 g. The copolymer had a methyl acrylate unit content of 50 mole% as determined by NMR spectroscopy, and an intrinsic viscosity, measured at 30° C. in toluene, of 0.49.

A 1-liter autoclave equipped with a stirring device, a pressure gauge and a needle valve was charged with 50 g of the resulting vinyl acetate/methyl acrylate copolymer, and 500 ml of n-butylamine. They were reacted at 120° C. for 28 hours.

The reaction mixture was obtained as a uniform solution. When the resulting reaction solution was poured into a large amount of acetone, a solid precipitated. The solid was pulverized in acetone using a mixer, washed with acetone, recovered by filtration, and dried overnight at room temperature under reduced pressure. The results of elemental analysis of the resulting product well agreed, as shown in Table 1, with those obtained under the assumption that the entire vinyl acetate unit in the starting vinyl acetate/methyl acrylate copolymer was converted to the vinyl alcohol unit and the entire methyl acrylate unit, to a butyl acrylamide unit. The copolymer was soluble in water, methanol, ethanol, and isopropanol. The infrared absorption spectrum of a cast film prepared on sodium chloride crystal plate from a solution of the copolymer in isopropanol showed an absorption based on hydroxy at 3250 cm$^{-1}$ and an absorption based on the substituted amide at 1640 cm$^{-1}$, and the intensity of an absorption at 1740 cm$^{-1}$ based on the ester bond was very weak. This led to the confirmation that the vinyl acetate unit in the starting copolymer was converted to the vinyl alcohol unit, and the metal acrylate unit, to the n-butyl acrylamide.

EXAMPLES 2 to 4

The same 1-liter autoclave as described in Example 1 was charged with 50 g of the starting vinyl acetate/methyl acrylate copolymer prepared in Example 1, and each of the amines shown in Table 1 was added in an amount of 500 ml instead of the n-butylamine in an atmosphere of nitrogen. The mixture was maintained at the temperatures and for the times indicated in Table 1 with stirring, and then cooled to room temperature.

The data of the recovered polymers are shown in Table 1.

EXAMPLES 5 TO 10

A 2-liter separable flask equipped with a stirring device, a condenser and a thermometer was charged with 100 g of the vinyl acetate/methyl acrylate copolymer prepared in Example 1, and 1000 ml of each of the amines shown in Table 1 was added in an atmosphere of nitrogen. The mixture was maintained at the temperatures and for the times indicated in Table 1 with stirring, and then cooled to room temperature. In the reaction mixture after the reaction, the starting vinyl acetate/methyl acrylate copolymer did not remain as a solid, but was a uniform solution. When the reaction mixture was poured into a large amount of acetone, a solid precipitated. The solid was pulverized in acetone using a ker-mixer, washed with acetone, recovered by filtration, and dried overnight under reduced pressure. The elemental analysis values of the resulting product, as shown in Table 1, were close to those obtained under the assumption that the entire vinyl acetate unit in the starting copolymer was converted to the vinyl alcohol unit and the entire methyl acrylate unit, to the acrylamide unit having the same substituent as the amine used.

The copolymers obtained in Examples 5 to 8 were each dissolved in isopropanol, and cast films were prepared from the solutions on a sodium chloride crystal plate. The copolymers obtained in Examples 9 and 10 were dissolved in water, and cast films were prepared from the aqueous solutions on a KRS 5 (mixed crystals of thallium bromide and thallium iodide) plate. The infrared absorption spectra of these films were determined. In any of these spectra, an absorption at 1640 $cm^{-1}$ based on the substituted amide was detected, and the intensity of the absorption of 1740 $cm^{-1}$ based on the ester bond became very weak. This led to the confirmation that the vinyl acetate unit in the starting copolymer was converted to the vinyl alcohol unit, and the methyl acrylate unit, to the acrylamide unit having the same substituent as the amine used.

An aqueous solution of each of the copolymers obtained in Examples 9 and 10 containing a vinyl alcohol unit and a N-substituted acrylamide unit was coated on a cleaned glass sheet, dried in the air, and heat-treated at 120° C. for 3 minutes to form a film of the copolymer. The glass sheets thus obtained were cooled to below 0° C. in a refrigerator, and then the temperature was returned to room temperature. No haze was observed in these glass sheets, and it was confirmed that the copolymers containing the vinyl alcohol unit and the N-substituted acrylamide unit had an anti-haze effect.

Ten grams of each of the copolymers obtained in the foregoing Examples in which the N-substituent of the N-substituted acrylamide units were n-butyl (Example 1), n-hexyl (Example 5), n-dodecyl (Example 6), cyclohexyl (Example 7), allyl (Example 2), phenyl (Example 4), and benzyl (Example 8), respectively was dissolved in 100 ml of isopropanol to form a uniform clear solution of the respective polymer.

The copolymer solution was coated on a sheet of polytetrafluoroethylene, dried in the air, and heat-treated at 180° C. for 15 minutes to prepare a transparent film having a thickness of 5 to 10μ. The infrared absorption spectra of the resulting films were determined. It was found that in any of these, the intensities of the absorptions at 3250 $cm^{-1}$ based on hydroxy and at 1640 $cm^{-1}$ based on the N-substituted amide group which had been seen in the copolymers were much weakened, and a new absorption based on the carbonyl group of an N-substituted pyrrolidone ring was detected at 1660 $cm^{-1}$. This fact led to the confirmation that in any of these copolymers, the adjacent vinyl alcohol unit and the N-substituted acrylamide unit underwent a dehydrocyclization reaction to form a lactam ring structure.

The decomposition temperature of each of the films of these polymers having a lactam ring structure was measured by a thermobalance. It was found that in any of the samples tested, the temperature at which a weight loss began was at least 330° C., and all of them had superior thermal stability.

Furthermore, these films having a lactam ring structure were dipped overnight at room temperature in acetone, ethyl acetate, n-hexane, benzene, toluene, kerosene, and a thinner lacquer, respectively, and the states of the films after dipping were observed. It was found that no change occurred as a result of dipping, and these polymers having a lactam ring structure had superior resistance to organic solvents.

Furthermore, the same copolymer solutions as set forth above were each coated on a glass sheet, an aluminum plate, an iron plate, a tin plate and a stainless steel plate, respectively, dried in the air, and heat-treated at 190° C. for 15 minutes. Transparent films of polymers having a lactam ring structure were obtained. Then, the coated substrates were each cooled to −20° C., and then the temperature returned to room temperature. No crack or peeling of the coated films was observed. Using an Erichsen tester in accordance with JIS B-7729, the coated products (excepting the coated glass sheet) were subjected to an Erichsen test in accordance with JIS Z-2247, and all showed as Erichsen value of more than 10 mm. This led to the confirmation that the films of polymers containing an N-substituted lactam ring structure have superior flexibility and superior adhesion to substrates.

Furthermore, these films were tested for surface hardness using a pencil scratch tester in accordance with JIS K-5401. It was found that the pencil hardness was 3 to 4H for the film of a polymer having an N-n-butyl-pyrrolidone ring structure (Example 1), 2 to 3H for the film of a polymer having an N-n-hexylpyrrolidone ring structure (Example 5), 2 to 3H for the film of a polymer having an N-n-dodecylpyrrolidone structure (Example 6), 6H for the film of a polymer having an N-cyclohexylpyrrolidone ring structure (Example 7), 4 to 5H for the film of a polymer having an N-allylpyrrolidone ring structure (Example 2), 6H for the film of a polymer having an N-phenylpyrrolidone ring structure (Example 4), and 4 to 5H for the film of a polymer having a N-benzylpyrrolidone ring structure (Example 8). It was found therefore that the films of the polymers having a lactam ring structure have superior surface hardness.

These films were also tested for their resistances to water, acids and alkalies in the following manner.

Water resistance: Dipped in boiling water for 2 hours.
Acid resistance: Dipped for 2 hours in a 5% aqueous solution of hydrochloric acid at 40° C.
Alkali resistance: Dipped for 2 hours in a 3% aqueous solution of sodium hydroxide at room temperature.

After these tests, the surface appearances of these films showed no change at all.

COMPARATIVE EXAMPLE 1

A 1-liter autoclave equipped with a stirring device, a pressure gauge, a safety valve and a needle valve was charged with 50 g of the vinyl acetate/methyl acrylate copolymer obtained in Example 1, and then 500 ml of liquid ammonia collected by a "distillation charging method" by which ammonia was passed from an ammonia bomb through a pressure controller into a receptacle cooled with a dry ice methanol bath was introduced from the receptacle into the autoclave through the needle valve by a "distillation charging method". Then, the autoclave filled with the starting copolymer and ammonia was maintained at 30° C. for 20 hours with stirring to react the two materials. The reaction pressure was maintained at about 12 kg/cm$^2$ from the initial to the last stage of the reaction. After the reaction, the unreacted ammonia was slowly removed from the needle valve, and then the autoclave was opened. A transparent viscous reaction product was obtained at the bottom of the autoclave. A part of the reaction product was withdrawn, and dried at 40° C. under reduced pressure to afford a white solid mass. The solid mass was pulverized in a mortar in an atmosphere of nitrogen to afford a white powder. On the other hand, a small amount of water was added to the remaining reaction product at the bottom of the autoclave. The reaction product dissolved in water and could be recovered as an aqueous solution. When the aqueous solution was poured into a large excess of isopropanol, the reaction product precipitated as a white powder. It was recovered by filtration, and dried at 40° C. under reduced pressure to afford a white powdery solid having a uniform particle diameter. The total amount of the resulting solid was 33.0 g. This weight was close to the amount (33.5 g) which was calculated under the assumption that the entire vinyl acetate unit of the starting copolymer was converted to a vinyl alcohol unit, and the entire methyl acrylate unit, to an acrylamide unit.

A part of the resulting powder was again dissolved in water. The resulting clear aqueous solution was cast on a KRS-5 (mixed crystals of thallium bromide and thallium iodide) plate to form a film. The infrared absorption spectrum of the film showed an absorption at 3300 cm$^{-1}$ based on hydroxy and an absorption at 1650 cm$^{-1}$ based on amide. This led to the confirmation that the vinyl acetate unit in the starting copolymer was converted to the vinyl alcohol unit, and the methyl acrylate unit, to the acrylamide unit. The elemental analysis values of the modified copolymer were found as follows: C, 52.0%, H, 8.0%; O, 28.1%; N, 11.9%. These values were very close to the calculated values (C, 52.2%;, H, 7.9%; O, 27.8%; N 12.2%) which were obtained under the assumption that the entire vinyl acetate unit of the starting copolymer were converted to the vinyl alcohol unit, and the entire methyl acrylate unit, to the acrylamide unit.

The film was tested for its resistance to water and alkalies in the same way as in Example 1. The coated film peeled off, and was partly dissolved.

EXAMPLE 11

The same separable flask as in Example 1 was used as a polymerization reactor except that only one metering pump was used.

The flask was purged with nitrogen, and charged with 4000 ml of acetone, 1000 ml of isopropanol, 3492 ml (37.9 moles) of vinyl acetate and 188 ml (2.1 moles) of methyl acrylate, in this order. With stirring, the mixture was heated to 50° C. When this temperature was reached, 14.3 ml of an n-hexane solution containing 90 mmoles of t-butyl peroxypivalate was added, and the copolymerization was started. Thirty minutes after the initiation of the polymerization, 188 ml (2.1 moles) of methyl acrylate was added continuously as a given rate over the course of 30 minutes. Immediately after the addition, the polymerization reactor was dipped in an ice water bath, and then, the reaction mixture having the copolymer product dissolved in it was poured into a large excess of n-hexane to precipitate the resulting copolymer. The n-hexane used as a precipitant was removed by decantation. The product was washed twice with fresh n-hexane, and decantation was performed twice. The product was dried overnight at room temperature under reduced pressure. The amount of the vinyl acetate/methyl acrylate copolymer so obtained was 605 g. The content of the methyl acrylate unit was found to be 51 mole% by NMR spectroscopy. The copolymer had an intrinsic viscosity, measured in toluene at 30° C., of 0.16.

The same 2-liter separable flask as shown in Example 5 was charged with 100 g of the vinyl acetate/methyl acrylate copolymer so obtained, and then 1,000 ml of n-butylamine was added in an atmosphere of nitrogen. The mixture was maintained at 80° C. for 28 hours with stirring while refluxing n-butylamine. Then, the product was cooled to room temperature. The resulting reaction mixture was a slightly yellowish uniform clear solution. When the solution was worked up in the same way as in Example 1, 96.6 g of a white powdery solid was obtained.

The infrared absorption spectrum of the solid was determined in the same way as in Example 1. Same as in the case of the copolymer obtained in Example 1, an absorption at 3250 cm$^{-1}$ based on hydroxy and an absorption at 1640 cm$^{-1}$ based on the substituted amide were detected, and the intensity of an absorption at 1740 cm$^{-1}$ based on the ester bond was very weak.

The other properties of the copolymer were measured, and the results are shown in Table 1.

EXAMPLE 12

Using the same apparatus as used in Example 1, vinyl acetate and methyl acrylate were copolymerized in the same way as in Example 11 except that 5,000 ml of acetone was used as a solvent, the amounts of the vinyl acetate and methyl acrylate to be charged before the initiation of the polymerization were changed to 4364 ml (47.3 moles) and 238 ml (2.6 moles), respectively, and the amount of methyl acrylate to be added continuously by a metering pump over the course of 30 minutes after a lapse of 30 minutes from the initiation of the polymerization was changed to 239 ml (2.6 moles). The amount of the copolymer obtained was 1,300 g. The copolymer had a methyl acrylate unit content of 31 mole% by NMR spectroscopy and an intrinsic viscosity, measured at 30° C. in toluene, of 0.25.

Using the same 2-liter separable flask as described in Example 5, 100 g of the resulting vinyl acetate/methyl acrylate copolymer was reacted with n-hexylamine under the same condition as in Example 5. The reaction product was post-treated in the same way as in Example 5 to afford 88.7 g of a white powdery solid.

The infrared absorption spectrum of the copolymer measured in the same way as in Example 1 showed an absorption at 3250 cm$^{-1}$ based on hydroxy and an absorption at 1640 cm$^{-1}$ based on the substituted amine, and the absorption at 1740 cm$^{-1}$ ascribable to an ester bond was scarcely detected.

The results of the other measurements are shown in Table 1.

EXAMPLE 13

Using the same apparatus as in Example 11, vinyl acetate and methyl acrylate were copolymerized in the same way as in Example 11 except that the amounts of vinyl acetate and methyl acrylate fed to the system before the initiation of polymerization were changed to 1875 ml (20.7 moles) and 805 ml (8.9 moles), respectively, and the amount of methyl acrylate to be added by means of a metering pump continuously over the course of 30 minutes after a lapse of 30 minutes from the initiation of polymerization was changed to 450 ml (5.0 moles). The amount of the copolymer obtained was 1325 g. The copolymer had a methyl acrylate unit content of 69 mole% as determined by NMR spectroscopy, and an intrinsic viscosity, measured at 30° C. in toluene, of 0.23.

Then, 100 g of the vinyl acetate/methyl acrylate copolymer was reacted with cyclohexylamine under the same conditions as in Example 7 using the same 2-liter separable flask as shown in Example 5. The reaction product was worked up in the same way as in Example 7 to afford 134.0 g of a white powdery solid.

The infrared absorption spectrum of the copolymer showed an absorption at 3250 cm$^{-1}$ based on hydroxy and an absorption at 1640 cm$^{-1}$ based on substituted amine, and the intensity of the absorption at 1740 cm$^{-1}$ ascribable to the ester bond was weakened markedly as compared with the starting copolymer.

The results of the other measurements are shown in Table 1.

EXAMPLE 14

Allyl acetate and methyl acrylate were copolymerized in the same way as in Example 1 using the same apparatus as in Example 1 except that 1644 ml (15.4 mmoles) of allyl acetate was used instead of the vinyl acetate. The product was then worked up in the same way as in Example 1. The amount of the resulting allyl acetate/methyl acrylate copolymer was 1690 g. The copolymer had a methyl acrylate unit content, determined by NMR spectroscopy, of 59 mole%, an an intrinsic viscosity, as measured at 30° C. in toluene, of 0.61.

Then, 100 g of the allyl acetate/methyl acrylate copolymer was reacted with ethanolamine under the same conditions as in Example 9 using the same 2-liter separable flask as shown in Example 9. The product was worked up in the same way as in Example 9 to afford 103.8 g of a powdery solid.

The infrared absorption spectrum of the copolymer measured in the same way as in Example 9 showed absorptions ascribable to hydroxy and substituted amide as in Example 9, and the intensity of absorption of the ester bond was markedly smaller than that of the starting copolymer.

The results of the other measurements are shown in Table 1.

EXAMPLE 15

Vinyl acetate and ethyl acrylate were copolymerized in the same way as in Example 1 using the same apparatus as in Example 1 except that 1344 ml (12.4 moles) of ethyl acrylate was used instead of the methyl acrylate. The product was worked up in the same way as in Example 1. The amount of the resulting vinyl acetate/ethyl acrylate copolymer was 1935 g. The copolymer had an ethyl acrylate unit content, as determined by NMR spectroscopy, of 57 mole%, and an intrinsic viscosity, as measured at 30° C. in toluene, of 0.55.

Then, 100 g of the resulting vinyl acetate/ethyl acrylate copolymer was reacted with cyclohexylamine under the same conditions as in Example 7 using the same 2-liter separable flask as shown in Example 5. The product was worked up in the same way as in Example 7 to afford 110.4 g of a white powdery solid.

The infrared absorption spectrum of the copolymer was measured in the same way as in Example 7. Absorptions ascribable to the hydroxy and the substituted amide were detected same as in Example 7, and the intensity of the absorption ascribable to the ester bond was markedly smaller than that of the starting copolymer.

The results of the other measurements are shown in Table 1.

EXAMPLE 16

Vinyl acetate and methyl methacrylate were copolymerized using the same apparatus as used in Example 1 in the same way as in Example 1 except that 1315 ml (12.4 moles) of methyl methacrylate was used instead of the methyl acrylate. The product was worked up in the same way as in Example 1. The amount of the resulting vinyl acetate/methyl methacrylate copolymer was 1480 g. The copoloymer had a methyl methacrylate unit content, as determined by NMR spectroscopy, of 66 mole%, and an intrinsic viscosity, determined in toluene at 30° C., of 0.45.

Then, 100 g of the vinyl acetate/methyl methacrylate copolymer was reacted with ethanolamine under the same conditions as in Example 9 using the same 2-liter separable flask as used in Example 9. The product was worked up in the same way as in Example 9 to afford 101.5 g of a powdery solid.

The infrared absorption spectrum of the copolymer, measured in the same way as in Example 9, showed an absorption at 3250 cm$^{-1}$ based on hydroxy and an absorption at 1640 cm$^{-1}$ based on substituted amide, and the intensity of the absorption at 1740 cm$^{-1}$ based on the ester bond was far smaller than that of the starting copolymer.

The results of the other measurements are shown in Table 1.

Table 1

| Example | Starting copolymer Unit (1) | (mole %) | Unit (3) | (mole %) | Amine (amount in grams) | | Reaction conditions Temperature (° C) | Time (hrs.) |
| --- | --- | --- | --- | --- | --- | --- | --- | --- |
| 1 | Vinyl acetate | 50 | Methyl acrylate | 50 | n-Butylamine | 50 | 120 | 28 |
| 2 | Vinyl acetate | 50 | Methyl acrylate | 50 | Allylamine | 50 | 120 | 28 |
| 3 | Vinyl acetate | 50 | Methyl acrylate | 50 | Diethylamine | 50 | 120 | 28 |
| 4 | Vinyl acetate | 50 | Methyl acrylate | 50 | Aniline | 50 | 220 | 42 |
| 5 | Vinyl acetate | 50 | Methyl acrylate | 50 | n-Hexylamine | 100 | 135 | 28 |

Table 1-continued

| | | | | | | | | | |
|---|---|---|---|---|---|---|---|---|---|
| 6 | Vinyl acetate | 50 | Methyl acrylate | 50 | n-Dodecylamine | 100 | 220 | 28 |
| 7 | Vinyl acetate | 50 | Methyl acrylate | 50 | Cyclohexylamine | 100 | 145 | 28 |
| 8 | Vinyl acetate | 50 | Methyl acrylate | 50 | Benzylamine | 100 | 185 | 28 |
| 9 | Vinyl acetate | 50 | Methyl acrylate | 50 | Ethanolamine | 100 | 170 | 28 |
| 10 | Vinyl acetate | 50 | Methyl acrylate | 50 | Diethanolamine | 100 | 220 | 42 |
| 11 | Vinyl acetate | 49 | Methyl acrylate | 51 | n-Butylamine | 100 | 80 | 28 |
| 12 | Vinyl acetate | 69 | Methyl acrylate | 31 | n-Hexylamine | 100 | 135 | 28 |
| 13 | Vinyl acetate | 31 | Methyl acrylate | 69 | Cyclohexylamine | 100 | 145 | 28 |
| 14 | Allyl acetate | 41 | Methyl acrylate | 59 | Ethanolamine | 100 | 170 | 28 |
| 15 | Vinyl acetate | 43 | Ethyl acrylate | 57 | Cyclohexylamine | 100 | 145 | 28 |
| 16 | Vinyl acetate | 34 | Methyl methacrylate | 66 | Diethanolamine | 100 | 170 | 28 |

Copolymer formed

| Example | Amount yielded (g) | Elemental analysis (%) Found C | H | O | N | Calculated (*) C | H | O | N | Contents of units (mole %) Unit (1) | Unit (2) | Unit (3) | Unit (4) | (2)+(4) or (4)+(2) (%) | Number average molecular weight |
|---|---|---|---|---|---|---|---|---|---|---|---|---|---|---|---|
| 1 | 46.9 | 63.0 | 10.2 | 18.6 | 8.1 | 63.1 | 10.0 | 18.7 | 8.2 | 0 | 50 | 0 | 50 | above 90 | 10,100 |
| 2 | 43.0 | 62.0 | 8.3 | 20.7 | 8.7 | 61.9 | 8.4 | 20.6 | 9.0 | 0 | 50 | 2 | 48 | " | 9,200 |
| 3 | 47.5 | 63.2 | 9.8 | 18.9 | 7.9 | 63.1 | 10.0 | 18.7 | 8.2 | 0 | 50 | 2 | 48 | " | 10,200 |
| 4 | 53.6 | 69.5 | 7.0 | 16.5 | 7.0 | 69.1 | 6.9 | 16.7 | 7.3 | 1 | 49 | 2 | 48 | " | 11,300 |
| 5 | 115.0 | 66.2 | 10.8 | 16.2 | 6.8 | 66.3 | 10.6 | 16.1 | 7.0 | 0 | 50 | 1 | 49 | " | 11,600 |
| 6 | 159.8 | 72.6 | 11.8 | 11.0 | 4.6 | 72.0 | 11.7 | 11.3 | 4.9 | 1 | 49 | 3 | 47 | " | 16,600 |
| 7 | 112.3 | 67.3 | 9.5 | 16.3 | 6.9 | 67.0 | 9.7 | 16.2 | 7.1 | 0 | 50 | 2 | 48 | " | 11,700 |
| 8 | 115.7 | 70.3 | 7.4 | 15.7 | 6.6 | 70.2 | 7.4 | 15.6 | 6.8 | 0 | 50 | 1 | 49 | " | 12,100 |
| 9 | 93.0 | 56.2 | 8.2 | 30.3 | 8.9 | 52.8 | 8.2 | 30.2 | 8.8 | 0 | 50 | 0 | 50 | " | 9,600 |
| 10 | 116.0 | 53.4 | 8.1 | 31.7 | 6.8 | 53.2 | 8.4 | 31.5 | 6.9 | 0 | 50 | 1 | 49 | " | 12,000 |
| 11 | 96.6 | 63.4 | 9.9 | 18.7 | 8.0 | 63.2 | 10.0 | 18.5 | 8.3 | 0 | 49 | 2 | 49 | ca. 55 | 5,100 |
| 12 | 88.7 | 63.3 | 10.4 | 21.1 | 5.2 | 63.6 | 10.3 | 20.7 | 5.4 | 0 | 69 | 1 | 30 | ca. 35 | 6,300 |
| 13 | 134.0 | 68.5 | 9.7 | 13.9 | 7.9 | 68.7 | 9.8 | 13.4 | 8.1 | 0 | 31 | 2 | 67 | ca. 35 | 6,500 |
| 14 | 103.8 | 54.9 | 8.5 | 28.0 | 8.6 | 54.7 | 8.5 | 27.7 | 9.0 | 0 | 41 | 3 | 56 | ca. 80 | 12,100 |
| 15 | 110.4 | 67.5 | 9.6 | 15.6 | 7.3 | 67.7 | 9.7 | 15.1 | 7.5 | 0 | 43 | 2 | 55 | ca. 85 | 21,500 |
| 16 | 101.5 | 55.4 | 8.7 | 26.8 | 9.1 | 55.6 | 8.7 | 26.5 | 9.2 | 0 | 34 | 1 | 65 | ca. 70 | 18,700 |

*Calculated values obtained under the assumption that the entire unit (1) was converted to unit (2), and the entire unit (3), to unit (4).

EXAMPLE 17

An equimolar mixture of vinyl acetate and methyl acrylate and an n-hexane solution of t-butyl peroxy isopropyl carbonate were continuously fed with stirring to an n-hexane solution containing a complex of ethylaluminum dichloride and methyl benzoate at 20° C. over the course of 5 hours. The reaction mixture was further polymerized for 15 hours to form a straight-chain copolymer of vinyl acetate/methyl acrylate having a methyl acrylate unit content of 50 mole% and a number average molecular weight of 10,000. The copolymer was treated in methanol in the presence of sodium methoxide as a catalyst at about 50° C. for about 5 hours to form a copolymer to be used as a starting material. From the yielded amount, elemental analysis values and infrared absorption spectrum of the starting copolymer, it was confirmed that this copolymer resulted from the conversion of the starting vinyl acetate unit of the vinyl acetate/methyl acrylate copolymer into a vinyl alcohol unit by alcoholysis.

In a 500 ml three-necked flask equipped with a stirrer, a condenser and a distillation device, 20 g of the resulting starting copolymer was suspended in 200 ml of n-butylamine, and the suspension was stirred. The starting copolymer was seen to dissolve gradually in n-butylamine, and a reaction was seen to take place between them. When the temperature of the reaction system was raised to about 70° C. in order to increase the rate of the reaction, methanol could be removed through the distillation device. By performing the reaction for about 8 hours, a somewhat viscous clear uniform solution was formed. After the reaction, the solution was poured into a large excess of diethyl ether. The reaction product precipitated as a white powder. It was collected by filtration, and dried at 40° C. under reduced pressure to recover a white powdery solid having a uniform particle diameter. The amount yielded of the solid was 24.8 g which amount was close to the theoretical amount (26.2 g) which was calculated under the assumption that the entire methyl acrylate unit of the starting copolymer composed of the vinyl alcohol unit and the methyl acrylate unit was converted to an N-n-butyl acrylamide unit.

A part of the n-butylamine solution after the reaction was coated on a sodium chloride plate, and dried at 70° C. under reduced pressure to form a cast film. The infrared absorption spectrum of this film showed an absorption at 1655 cm$^{-1}$ based on the monoalkyl-substituted amide group. The elemental analysis values of the reaction product were: C, 63.3%; H, 9.8%; O, 18.5%; N, 8.4%. This led to the confirmation that a straight-chain copolymer composed of a vinyl alcohol unit and an N-n-butyl acrylamide unit was formed as a result of the complete conversion of the methyl acrylate unit in the starting copolymer into the N-n-butyl acrylamide unit, and that the resulting copolymer was composed of 50 mole% of the vinyl alcohol unit and 50 mole% of the N-n-butyl acrylamide unit.

EXAMPLES 18 TO 25

Twenty grams of the same vinyl alcohol/methyl acrylate copolymer as used in Example 17 was used as a starting material, and reacted in the same way as in Example 17 except that each of the amines show in Table 2 was used instead of the n-butylamine. The reaction proceeded while exhibiting almost the same behavior, and a viscous clear uniform amine solution was obtained. The solution was treated in the same way as in Example 17 to obtain a white solid powder. The infrared absorption spectrum of the white powder showed an absorption at 1655 cm$^{-1}$ based on the monoalkyl-substituted amide group. The results of other measurements are shown in Table 2.

Table 2

| | Example | 17 | 18 | 19 | 20 | 21 | 22 | 23 | 24 | 25 |
|---|---|---|---|---|---|---|---|---|---|---|
| | Amine | n-Butyl-amine | n-Hexyl-amine | n-Dodecyl-amine | Benzyl-amine | Cyclo-hexyl-amine | Aniline | β-Amino-ethyl alcohol | Di-n-butyl-amine | Di-ethanol-amine |
| | (amount) | 200 ml | 200 ml | 200 g | 200 ml | 200 ml | 200 ml | 200 ml | 200 ml | 200 ml |
| | Reaction conditions | | | | | | | | | |
| | Temperature (° C.) | 70 | 135 | 150 | 150 | 145 | 70 | 170 | 70 | 170 |
| | Time (hrs.) | 8 | 8 | 8 | 8 | 8 | 8 | 8 | 8 | 8 |
| | Amount yielded (g) | 24.8 | 29.2 | 40.5 | 29.6 | 28.9 | 27.8 | 21.0 | 31.6 | 29.0 |
| | Elemental analysis | | | | | | | | | |
| | C (%) | 63.3 | 66.2 | 72.0 | 70.4 | 64.0 | 69.8 | 52.1 | 69.0 | 52.2 |
| Co-polymer formed | H (%) | 9.8 | 10.7 | 11.7 | 7.4 | 10.4 | 7.3 | 8.5 | 11.4 | 8.6 |
| | O (%) | 18.5 | 16.1 | 11.3 | 15.8 | 18.8 | 17.1 | 30.6 | 14.2 | 33.5 |
| | N (%) | 8.4 | 7.0 | 4.9 | 6.4 | 6.7 | 5.9 | 8.8 | 5.5 | 6.7 |
| | Unit (2) (%) | 50 | 50 | 50 | 50 | 50 | 50 | 50 | 50 | 50 |
| | Unit (3) (%) | 0 | 0 | 1 | 3 | 3 | 9 | 1 | 6 | 2 |
| | Unit (4) (%) | 50 | 50 | 49 | 47 | 47 | 41 | 49 | 44 | 48 |
| | (2)+(4) or (4)+(2) (%) | above 90 | above 90 | above 90 | above 90 | above 90 | above 90 | above 90 | above 90 | above 90 |
| | Number average molecular weight | 10,000 | 11,600 | 16,500 | 11,000 | 16,500 | 11,000 | 9,200 | 12,500 | 11,900 |

EXAMPLES 26 TO 28

Each of the copolymers shown in Table 3 was used instead of the vinyl acetate/methyl acrylate copolymer used in the alcoholysis in Example 17, and was subjected to alcoholysis in the same way as in Example 17 under different alcoholysis conditions using sodium methoxide as a catalyst.

The resulting starting copolymer (20 g) was reacted with cyclohexylamine in an autoclave in the same way as in Example 17. A similar clear viscous reaction product was obtained. It could be recovered as a white powder by the re-precipitation method using isopropanol.

The infrared absorption spectrum and NMR spectrum of the product measured in the same way as in Example 17 showed absorptions at 1650 cm$^{-1}$ which indicated the presence of an acrylamide unit.

The results are shown in Table 3.

Table 3

| | Example | 17 | 26 | 27 | 28 |
|---|---|---|---|---|---|
| Starting co-polymer | Composition (mole %) | Vinyl acetate (50) Methyl acrylate (50) | Vinyl acetate (49) Methyl acrylate (51) | Vinyl acetate (49) Methyl methacrylate (51) | Allyl acetate (37) Methyl acrylate (63) |
| | Number average molecular weight | 10,000 | 15,000 | 9,000 | 18,000 |
| | Alcoholysis | | | | |
| | Alcohol used | Methanol | Ethanol | Methanol | Methanol |
| | Temperature (° C.) | 50 | 60 | 50 | 50 |
| | Time (hrs.) | 5 | 5 | 5 | 5 |
| | Amount yielded (g) | 24.8 | 25.9 | 28.6 | 28.5 |
| | Elemental analysis | | | | |
| | C (%) | 63.3 | 66.9 | 67.6 | 67.7 |
| Co-polymer formed | H (%) | 9.8 | 9.3 | 9.4 | 11.4 |
| | O (%) | 18.5 | 16.3 | 16.5 | 14.5 |
| | N (%) | 8.4 | 7.5 | 6.5 | 6.4 |
| | Unit (1) (%) | 0 | 0 | 0 | 0 |
| | Unit (2) (%) | 50 | 49 | 49 | 37 |
| | Unit (3) (%) | 0 | 2 | 3 | 6 |
| | Unit (4) (%) | 50 | 49 | 48 | 57 |
| | (2) + (4) or (4) + (2) (%) | above 90 | above 90 | above 90 | ca. 75 |
| | Number average molecular weight | 10,000 | 17,000 | 10,200 | 22,500 |

EXAMPLE 29

A 2-liter separable flask equipped with a stirring device, a condenser, a thermometer and three metering pumps was used as a polymerization reactor, and charged with 200 ml of methanol, 25.8 g (0.3 mole) of vinyl acetate, and 10.7 g (0.08 mole) of N-t-butyl acrylamide in an atmosphere of nitrogen. With stirring, the temperature of the reaction system was raised to 50° C. When the temperature of the reaction system reached 50° C., 3.48 g (0.02 mole) of t-butyl peroxypivalate was added, and the copolymerization was started. The copolymerization was continued while continuously feeding 172.2 g (2.0 moles) of vinyl acetate from a first metering pump for 2 hours at a rate of 1 mole/hr, a solution of 366.3 g (2.88 moles) of N-t-butyl acrylamide in 800 ml of methanol from a second metering pump for 2 hours and 20 minutes so that the rate of N-butyl acrylamide fed was 1 mole/hr, and a solution of 6.97 g (0.04 mole) of t-butyl peroxypivalate in 200 ml of methanol from a third metering pump for 2.5 hours so that the feed rate of the t-butyl peroxypivalate became 0.01 mole/hr. The copolymerization proceeded while maintaining a homogeneous system. After the copolymerization for 2.5 hours, the polymerization reaction mixture was poured into a large amount of water. The resulting copolymer precipitated and came afloat on the surface of the water. The copolymer was collected, washed thoroughly with water, pulverized by a mixer into a powder, collected by filtration, and dried at 40° C. in vacuo. The amount of the vinyl acetate/N-t-butyl acrylamide copolymer so obtained was 465 g. NMR spectroscopy in deuterochloroform showed that the N-t-butyl acrylamide unit content of the copolymer was 51 mole%.

One hundred grams of the resulting vinyl acetate/N-t-butyl acrylamide copolymer was dissolved in 900 ml of methanol in a 2-liter separable flask equipped with a stirrer, a condenser and a thermometer. Then, 100 ml of a methanol solution containing 0.2 g of sodium methoxide was added to the resulting solution. The temperature of the system was raised to 65° C., and the reaction was performed for 5 hours with stirring. During the above reaction, there was no change in the homogeneous condition of the reaction system. The occurrence of reaction was noted however from the fact that methyl acetate formed by the reaction distilled from the condenser together with methanol used as solvent. After the reaction, the reaction mixture was poured into a large amount of acetone. The reaction product precipitated as a powder. The powder was collected by filtration, washed fully with water, and dried at room temperature in vacuo. The amount of the reaction product so obtained was 79.9 g which was very close to the theoretical amount (80.3 g) calculated under the assumption that the entire vinyl acetate unit of the vinyl acetate/N-t-butyl acrylamide copolymer used was converted to a vinyl alcohol unit.

The elemental analysis values found of this reaction product were C, 63.4%; H, 9.8%; O, 18.8%; N, 7.9%, which were in good agreement with the calculated values (C, 63.2%; H, 10.0%; O, 18.5%; N, 8.3%) which were obtained under the assumption that the entire vinyl acetate unit of the vinyl acetate/N-t-butyl acrylamide copolymer was converted to a vinyl alcohol unit.

The infrared absorption spectrum of the reaction product was determined using a cast film prepared from its methanol solution. It was found that the absorption at about 1740 cm$^{-1}$ ascribable to the ester carbonyl group of the vinyl acetate unit was no longer observed, and an absorption based on hydroxy was detected at about 3400 cm$^{-1}$. This led to the confirmation that the vinyl acetate unit of the vinyl acetate/N-t-butyl acrylamide copolymer was converted to a vinyl alcohol unit.

EXAMPLES 30 to 32

Vinyl acetate and N-substituted acrylamide were copolymerized in the same way as in Example 29 except that each of the compounds indicated in Table 4 was used as an N-substituted acrylamide to be initially charged into the polymerization reactor, and the N-substituted acrylamide to be additionally fed with the progress of the reaction was a solution of 2.88 moles of the N-substituted acrylamide in 800 ml of methanol.

The copolymer obtained was analyzed by NMR spectroscopy in the same way as in Example 29 to determine its N-substituted acrylamide content.

One hundred grams of each of the copolymers obtained in the above manner was reacted with methanol in the same way as in Example 29 using sodium methoxide as a catalyst, and worked up to form a final product. The results are shown in Table 4.

The infrared absorption spectra of these products were determined in the same way as in Example 29. It was found that the intensity of the absorption at about 1740 cm$^{-1}$ based on the ester carbonyl group of the vinyl acetate unit was very much weakened, and an absorption based on hydroxy was detected at about 3400 cm$^{-1}$. This led to the confirmation that the vinyl acetate unit of the starting copolymer was converted to a vinyl alcohol unit.

Table 4

| | Example | 29 | 30 | 31 | 32** |
|---|---|---|---|---|---|
| | N-substituted acrylamide | N-t-butyl acrylamide | N-t-octyl acrylamide | N-cyclohexyl acrylamide | N-phenyl acrylamide |
| Production of the starting copolymer | Amount fed at the start of reaction (g) (mole) | 10.7 0.08 | 14.7 0.08 | 12.3 0.08 | 17.7 0.12 |
| | Amount added during the reaction (g) | 366.3 | 527.9 | 441.3 | 423.9 |
| | Amount yielded (g) | 465 | 576 | 506 | 499 |
| | Content of N-substituted acrylamide (mole %) | 51 | 49 | 49 | 50 |
| Copolymer formed | Amount yielded (g) | 79.9 | 83.5 | 82.4 | 81.0 |
| | Elemental analysis (found) | | | | |
| | C (%) | 63.4 | 68.6 | 67.2 | 69.4 |
| | H (%) | 9.8 | 10.8 | 9.8 | 6.9 |
| | O (%) | 18.8 | 14.6 | 16.1 | 17.0 |
| | N (%) | 7.9 | 6.0 | 6.9 | 7.3 |
| | Elemental analysis (calculated)* | | | | |
| | C (%) | 63.2 | 68.7 | 67.0 | 69.1 |
| | H (%) | 10.0 | 11.1 | 9.7 | 6.9 |
| | O (%) | 18.5 | 14.1 | 16.2 | 16.7 |
| | N (%) | 8.3 | 6.2 | 7.1 | 7.3 |
| | Unit (1) (%) | 4 | 5 | 3 | 4 |
| | Unit (2) (%) | 45 | 46 | 45 | 46 |
| | Unit (4) (%) | 51 | 49 | 52 | 50 |
| | (2) + (4) or (4) + (2) (%) | ca. 85 | ca. 80 | ca. 80 | ca. 85 |
| | Number average molecular weight | 18,800 | 22,600 | 17,500 | 15,000 |

*Calculated under the assumption that the entire vinyl acetate unit (1) of the starting copolymer was converted to the vinyl alcohol unit (2).
**In the production of the starting copolymer, the amount of vinyl acetate to be initially charged into the polymerization reactor was 34.4 g (0.4 mole).

EXAMPLE 33

One hundred grams of the vinyl acetate/N-t-butyl acrylamide copolymer obtained in Example 29 was worked up in the same way as in Example 29 except that 900 ml of ethylene glycol was used instead of methanol, 100 ml of an ethylene glycol solution of 0.2 g of sodium hydroxide was used instead of the methanol solution of sodium methoxide, and the reaction temperature was changed to 150° C. There was obtained 79.6 g of a reaction product.

The infrared absorption spectrum of the product was substantially the same as that obtained in Example 29. This led to the confirmation that the vinyl acetate unit of the vinyl acetate/N-t-butyl acrylamide copolymer was converted to a vinyl alcohol unit.

The results of other measurements including elemental analysis values and the contents of the constituents are shown in Table 5.

EXAMPLE 34

One hundred grams of the vinyl acetate/N-t-butyl acrylamide copolymer synthesized in Example 29 was placed in a 2-liter autoclave equipped with a stirrer, a thermometer, a pressure gauge, a safety valve and two needle valves, and then 1,000 ml of isopropanol was fed into it. Liquid ammonia (50 ml) collected by a "distillation charging method" into a dry ice-methanol-cooled receptacle from an ammonia bomb through a pressure controlling device was fed into the autoclave in the cooled state from the receptacle through the needle valves by a "distillation charging method". The autoclave was then heated to 120° C., and the contents were maintained for 8 hours at this temperature with stirring. The pressure was about 6 kg/cm² from the initial to the last stages of the reaction. After the reaction, the autoclave was cooled to room temperature, and the ammonia was driven off by opening the needle valves. The ammonia was completely removed by passing nitrogen gas into the autoclave through one of the needle valves and discharging it from the other. The reaction mixture obtained was treated in the same way as in Example 29 to afford 80.8 g of a powdery product.

The infrared absorption spectrum of this product showed that the intensity of the absorption at about 1740 cm⁻¹ based on the ester carbonyl group of the vinyl acetate unit was very much weakened, and an absorption based on hydroxy was detected at about 3400 cm⁻¹. This led to the confirmation that the vinyl acetate unit of the starting vinyl acetate/N-t-butyl acrylamide copolymer was converted to a vinyl alcohol unit.

The results of other measurements are shown in Table 5.

Table 5

| Sample | 29 | 30 | 34 |
|---|---|---|---|
| Alcoholysis Alcohol | Methanol | Ethylene glycol | Isopropanol |
| Catalyst | Sodium methoxide | Sodium hydroxide | Ammonia |
| Elemental analysis (%) | | | |
| C | 63.4 | 63.3 | 63.0 |
| H | 9.8 | 10.1 | 9.6 |
| O | 18.8 | 18.4 | 19.3 |
| N | 7.9 | 8.2 | 8.0 |
| Unit (1) (%) | 4 | 8 | 2 |
| Unit (2) (%) | 45 | 41 | 47 |
| Unit (4) (%) | 51 | 51 | 51 |
| (2) + (4) or (4) + (2) (%) | ca. 85 | ca. 85 | ca. 85 |
| Number average molecular weight | 18,000 | 18,600 | 18,700 |

What is claimed is:

1. A process for producing a film-forming and thermocurable unsaturated alcohol-substituted acrylamide copolymer consisting essentially of (1) 0 to 20 mole% of a unit of the formula

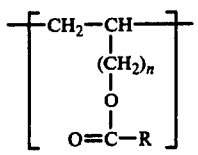

wherein R represents a group selected from the class consisting of alkyl groups with 1 to 7 carbon atoms and aryl groups with 6 to 7 carbon atoms, and $n$ is 0 or 1, (2) 30 to 70 mole% of a unit of the formula

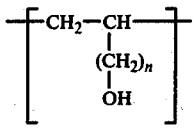

wherein $n$ is as defined above, (3) 0 to 20 mole% of a unit of the formula

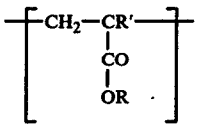

wherein R' represents a hydrogen atom or a lower alkyl group, and R is as defined above, and (4) 30 to 70 mole% of a unit of the formula

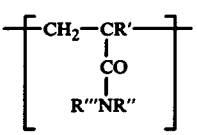

wherein R' is as defined above, R" represents a group selected from the class consisting of alkyl groups with 1 to 18 carbon atoms, cycloalkyl groups with 5 to 6 carbon atoms, hydroxyalkyl groups with 2 to 4 carbon atoms and aryl groups with 6 to 7 carbon atoms, and R'" represents a group selected from the class consisting of a hydrogen atom and the group R", the amount of each unit being based on the total amount in moles of units (1) to (4); which comprises reacting a copolymer consisting essentially of (a) unit (1) of the formula

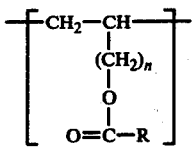

(1)

wherein R and $n$ are as defined, and (b) unit (3) of the formula

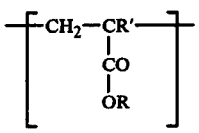

(3)

wherein R' and R are as defined, with an amine selected from the group consisting of primary and secondary amines of the formula

NH₂R"

and

NHR"R'"

wherein R" and R'" are as defined above.

2. A process for producing a film-forming and thermocurable unsaturated alcohol-substituted acrylamide copolymer consisting essentially of (1) 0 to 20 mole% of a unit of the formula

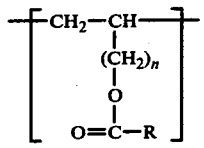

wherein R represents a group selected from the class consisting of alkyl groups with 1 to 7 carbon atoms and aryl groups with 6 to 7 carbon atoms, and $n$ is 0 or 1, (2) 30 to 70 mole% of a unit of the formula

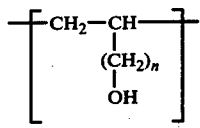

wherein $n$ is as defined above, (3) 0 to 20 mole% of a unit of the formula

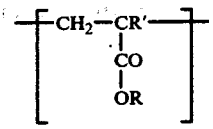

wherein R' represents a hydrogen atom or a lower alkyl group, and R is as defined above, and (4) 30 to 70 mole% of a unit of the formula

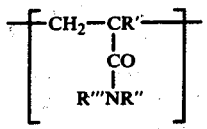

wherein R' is as defined above, R" represents a group selected from the class consisting of alkyl groups with 1 to 18 carbon atoms, cycloalkyl groups with 5 to 6 carbon atoms, hydroxyalkyl groups with 2 to 4 carbon atoms and aryl groups with 6 to 7 carbon atoms, and R''' represents a group selected from the class consisting of a hydrogen atom and the group R''', the amount of each unit being based on the total amount in moles of units (1) to (4); which comprises reacting a copolymer consisting essentially of (a) unit (2) of the following formula

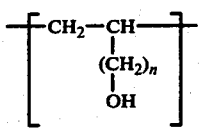

wherein $n$ is as defined above, and (b) unit (3) of the following formula

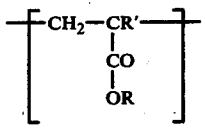

wherein R' and R are as defined above, with an amine selected from the group consisting of primary and secondary amines of the formula

and

wherein R" and R''' are as defined above.

* * * * *